Dec. 17, 1963  J. L. FERGASON ETAL  3,114,836
THERMAL IMAGING DEVICES UTILIZING A CHOLESTERIC
LIQUID CRYSTALLINE PHASE MATERIAL
Filed March 4, 1960  2 Sheets-Sheet 1
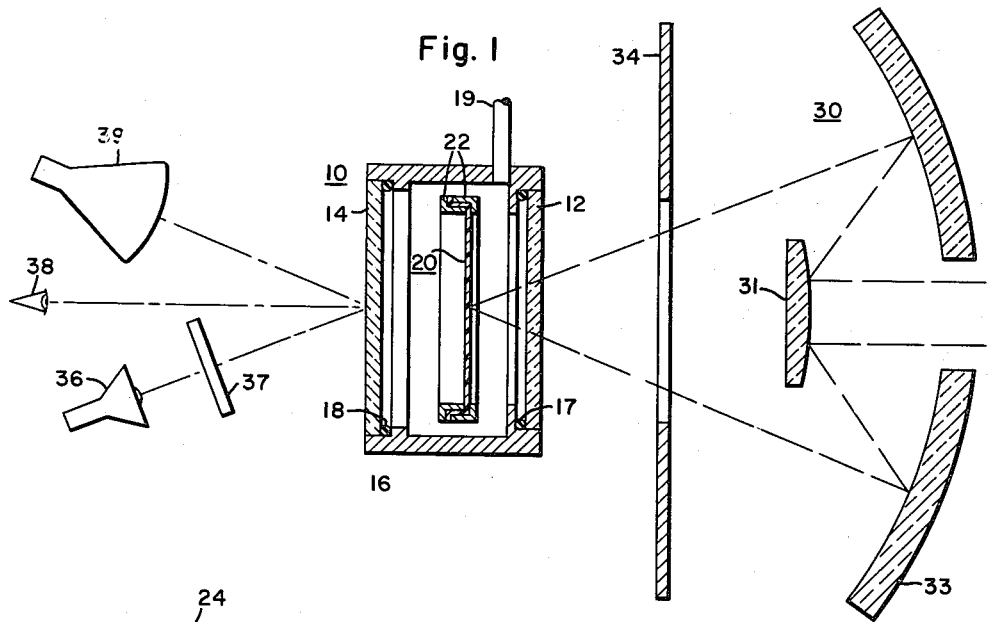
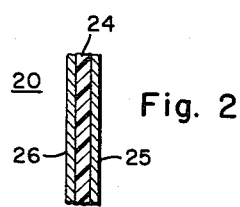
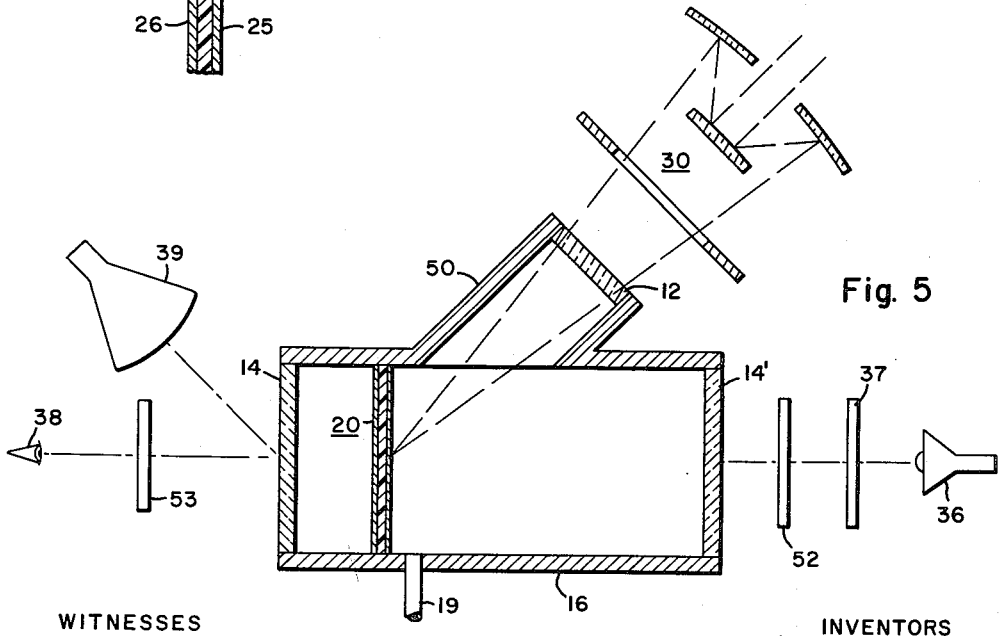
WITNESSES
John E. Healy, Jr.
Gordon H. Telfer
INVENTORS
James L. Fergason
Thomas P. Vogl &
Max Garbuny
BY Charles F. Renz
ATTORNEY

United States Patent Office 3,114,836
Patented Dec. 17, 1963

3,114,836
THERMAL IMAGING DEVICES UTILIZING A CHOLESTERIC LIQUID CRYSTALLINE PHASE MATERIAL
James L. Fergason, Pittsburgh, Thomas P. Vogl, Penn Hills Township, Allegheny County, and Max Garbuny, Pittsburgh, Pa., assignors to Westinghouse Electric Corporation, East Pittsburgh, Pa., a corporation of Pennsylvania
Filed Mar. 4, 1960, Ser. No. 12,703
12 Claims. (Cl. 250—83)

This invention relates generally to thermally responsive devices and more particularly to devices for responding to thermal patterns and converting them to visible patterns.

In many applications, it is desirable to provide means for giving a visual indication of the temperature of an object. In the home, the high temperature of kitchen utensils and the like presents a source of danger to persons particularly children, who might come into contact with them without knowing the extent of danger. A similar danger exists in regard to many forms of industrial equipment. A direct visual indication that an object is so hot that contact with it is dangerous would prevent many burns.

Apart from the safety aspect, visual temperature indications by direct means would provide a decorative and useful agency. Only a few of the possible applications in this field are a temperature indicating baby dish or baby bottle, a shower nozzle or bathtub liner, a pattern similar to a tapestry for room decoration, a refrigerator inner wall liner and an ashtray liner.

In applications such as the foregoing, the thermally sensitive member may be placed directly on the object whose temperature is to be indicated. In other applications, this is not possible and an intermediate agency must be employed. It is an application of the latter type that the following description will primarily discuss because of the immediate importance of a device in accordance with this invention in the field of infrared imaging for military purposes. However, it will be apparent that the scope of the present invention encompasses the aforementioned devices wherein the object is in contact with the thermally sensitive member.

Much effort has been directed to the problem of viewing objects by the radiation emitted from them which falls within the infrared portion of the electromagnetic spectrum. Objects emit infrared radiation, which is invisible to the naked eye, having an intensity which is a function of the temperature and the emissivity of the object. Therefore, the problem has been to convert a heat image which is invisible to the eye into an image which can be seen. Various schemes have been proposed for this purpose. One disadvantage which exists in most of the presently known devices is that the member on which the heat image is imposed, for conversion to a visible image, is not sufficiently sensitive to distinguish between objects which are emitting radiation in intensities which are not greatly different. Another common drawback is that in order to obtain a visible image a complex device is necessary to convert the heat pattern. The complexity frequently resides in the electrical components necessary for the device to function, often including a tube in which an electron beam is generated, resulting in a bulky and costly device which is unsuitable for many applications.

The present invention provides a device having a thermally sensitive member of a material or materials which are capable, by reason of their unique properties, of converting a heat pattern imposed thereon into a visible pattern by exposure of the thermally sensitive member to visible light.

It is, therefore, an object of the present invention to provide improved thermally responsive devices wherein a temperature pattern is converted to a visible pattern.

It is another object of the present invention to provide a thermal imaging device having high sensitivity.

Another object is to provide a thermal imaging device which is simple in design and in operation.

Another object is to provide a thermal imaging device whose operation does not require complex electrical circuitry.

Another object is to provide a thermal imaging device employing thermally sensitive materials which convert a heat image imposed thereon directly into a visible image.

Another object is to provide a thermal imaging device in compact form which may be fabricated at a low cost.

Another object is to provide a device which indicates the temperature of an object by the visible color of a thermally sensitive film.

Another object is to provide a device which indicates the temperature of an object by the intensity of visible radiation of a given wavelength scattered from a thermally sensitive film.

Another object is to provide a device for converting a thermal image into a visible image having a color variation between objects of different temperature.

Another object is to provide a device for converting a thermal image into a visible image having an intensity variation between objects of different temperatures.

These and other objects of the present invention will become more readily apparent by reference to the following description, taken in conjunction with the accompanying drawings throughout which like reference characters indicate like parts, which drawing forms a part of this application and in which:

FIGURE 1 is a schematic view, partly in cross section, of a thermal imaging device constructed in accordance with the present invention;

FIG. 2 is an enlarged cross sectional view of the target structure of the thermal imaging device shown in FIG. 1;

Figure 3:
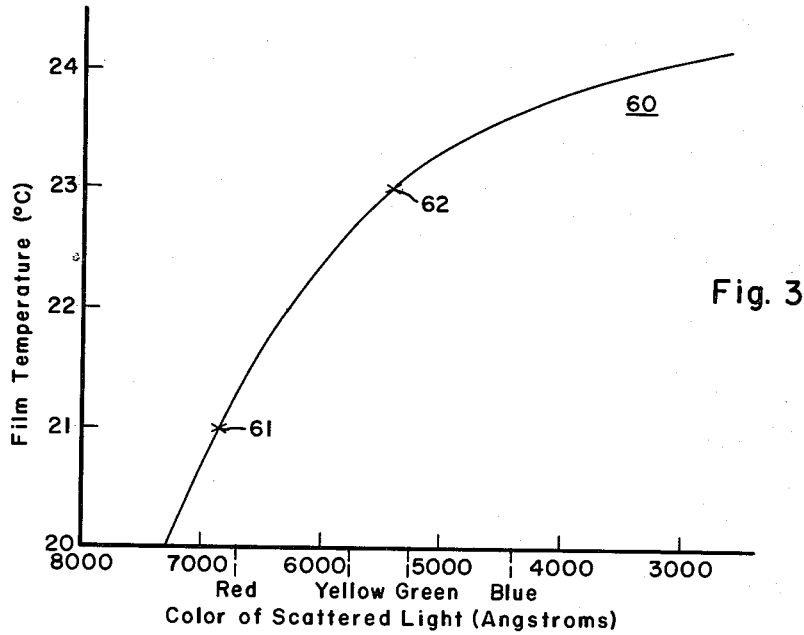
FIGS. 3 and 4 are typical graphs showing the results which may be achieved with a device constructed in accordance with the present invention; and, FIG. 5 is a schematic view, partly in cross section, of an alternate embodiment of a thermal imaging device in accordance with the present invention.

Referring now to FIGS. 1 and 2, there is shown an enclosure 10 having a generally rectangular cross section. The enclosure 10 has a first face 12 and a second face 14 on opposite sides thereof. The first face 12 of the enclosure 10 is transmissive to radiation in the infrared portion of the electromagnetic spectrum having a wavelength of about 2 microns to 15 microns. The first face 12 may be transmissive to other than infrared radiation. A suitable material from which the first face 12 may be made is NaCl, as is well known in the art. The second face 14 of the enclosure 10 is transmissive at least to visible radiation within the wavelength band of about 4200 to 7500 angstroms. The second face may also be transmissive to radiation in other portions of the spectrum. Many glasses are suitable materials from which the second face 14 may be made, for example, ordinary window glass. The enclosure 10 may have a cylindrical wall 16 for which tubular brass is one of many suitable materials. In many instances it is desirable to operate the device with the enclosure 10 evacuated in order to avoid temperature non-uniformities therein. For that purpose, conventional O-ring vacuum seals 17 and 18 are employed to provide tight seals where the faces 12 and 14 and the wall 16 join. Other suitable sealing means could, of course, be employed. Continuous evacuation may be achieved, if desired, by providing a fitting 19 for connection to a vacuum pump (not shown). Within the enclosure 10 is disposed a target structure 20 substantially parallel to the first and second faces 12 and 14. The target structure 20 may conveniently be held by annular supports 22 within the enclosure 10.

In the practice of this invention, there is no stringent requirement that the target 20 be placed in a vacuum enclosure. This is merely an expedient to avoid temperature variations on the target 20 due to air currents since it is possible, and often desirable, to form a target of such high sensitivity that even a slight air current would have a noticeable effect thereon. On the other hand, in some applications where a less sensitive target may be employed, the target may be exposed to the atmosphere and the enclosure 10 and transmissive faces 12 and 14 would not be required.

As shown in FIG. 2 the target structure 20 comprises three juxtaposed and coextensive layers of material 24, 25 and 26. The inner layer 24 is a thin support film of a material such as a polyester plastic such as polyethylene terephthalate, sold as "Mylar," or such as aluminum oxide. The support film has a thickness of only about .00025 inch or less. It is desirable for this purpose to use a material which may be fabricated in a very thin sheet but which still retains sufficient strength to support the other two layers 25 and 26. On one side of the thin support film 24 is a layer 25 of infrared absorbing material. This material may be gold black, for example, evaporated on the thin support film 24 in an inert atmosphere such as about 1–10 millimeters of nitrogen. Nickel is also suitable as the infrared absorbing layer 25 and may be evaporated onto the support layer 24 in a vacuum. The thickness of the infrared absorbing layer 25 is not critical but should be such as to absorb a large percentage of the infrared radiation incident thereon. A thickness of the order of about one micron of gold black is usually sufficient for this purpose, as is a layer of the order of about 1–10 angstroms of evaporated nickel. The infrared absorbing layer 25 would not be necessary if it were not for the fact that most if not all of the materials suitable for use as the thermally sensitive film 26 are substantially transparent to infrared radiation, which would result in only a negligible temperature change in the film. On the side of the thin support film 24 opposite the infrared absorbing layer 25 is a film 26 of a thermally sensitive material. Suitable materials for this film will be discussed hereinafter.

The target structure 20 is disposed within the enclosure 10 such that the infrared absorbing layer 25 faces the first face 12 of the enclosure 10 and the thermally sensitive film 26 faces the second face 14 of the enclosure. It is thereby made possible that the infrared absorbing layer 25 may be irradiated with infrared radiation and the thermally sensitive film 26 may be irradiated with visible radiation.

External to the enclosure 10 is shown an optical system 30 disposed between the source of infrared radiation (not shown) and the first face 12 of the enclosure. The optical system 30 includes mirrors 31, 32 and 33 and apertured member 34 which comprise a concentric spherical optical system. Many other optical systems are also suitable.

Infrared radiation from an object or scene to be viewed is directed by the optical system 30 through the first face 12 of the enclosure and focused upon the infrared absorbing layer 25 of the target structure 20. Radiation absorbed in the infrared absorbing layer 25 is converted to heat and causes a thermal image to be transmitted through the target structure. Thereby a temperature pattern is established on the thermally sensitive film 26 in accordance with the intensity of infrared radiation radiated by the objects in the scene viewed by the optical system 30. The support film 24 should be so thin as to be practically no barrier to the transmission of the temperature image from the infrared absorbing layer 25 to the thermally sensitive layer 26. Support film 24 serves primarily only as a support and its presence as an influence upon the thermal properties of the target 20 is not essential to our invention. It would often be desirable to omit the support film 24 and employ a target comprising only an infrared absorbing layer and a thermally sensitive film, if either of these layers were sufficiently strong to support the structure. The support film 24 should have a low thermal time constant, that is, the time required for it to reach a state in which it radiates as much energy as it absorbs should be short. The film 24 should also have low lateral heat conductivity to preserve resolution. These desired properties are best obtained by making the support film 24 as thin as possible in keeping with mechanical requirements.

On the side of the enclosure 10 opposite the optical system 30 is an illuminating means such as the lamp 36 directing visible radiation through a filter 37, which allows the passage of a desired portion of the spectrum, onto the second face 14 of the enclosure 10. The visible radiation is transmitted through the second face 14 and impinges upon the thermally sensitive film 26. A viewer 38 may look through the second face 14 of the enclosure 10 and view the thermally sensitive film 26 which displays a visible image corresponding to the temperature pattern imposed thereon. The viewer 38 may be human or a suitable image pickup tube or some other type of detector.

It should be noted that while it is believed most useful that the lamp 36 provide visible radiation so as to produce a visible image, the lamp 36 might in some applications be emissive in some other portion of the spectrum, such as the ultraviolet, in which case the resulting image would also be in that portion of the spectrum. Of course, it may be the case that ambient lighting provides light in the desired portion of the spectrum, in which case additional illumination by a lamp 36 would not be necessary.

The image is produced by the interaction of the light from the illuminating means 36 with the thermally sensitive film 26 upon which the temperature pattern exists. The interaction takes place in a temperature dependent manner.

The thermally sensitive film 26 is a thin film of a material which has an optically active liquid crystalline phase and is in that phase when the device is operated. Materials having a liquid crystalline phase do not pass directly from the solid into the liquid state upon heating but have an intermediate state which is not a true solid and not a true liquid. This state may also be reached by cooling a material of this type in the liquid state. In addition, materials having a liquid crystalline phase may be caused to go into that phase by treating the material with a suitable solvent such as chloroform or petroleum ether. Once having entered the liquid crystalline phase the material will remain in that phase so long as environmental conditions are controlled within certain limits. Materials in the liquid crystalline phase are generally characterized by their having fluidity as well as birefringence. That is, while materials in this phase have some properties of liquids, they have some optical properties which are characteristic of true crystals. As used herein, the expression "materials having a liquid crystalline phase" is intended to be synonymous with "materials in the mesomorphic state." For further general information on this broad class of materials, reference should be made to the article by G. H. Brown and W. G. Shaw in Chemical Reviews, vol. 57, No. 6, December 1957, p. 1049, entitled "The Mesomorphic State — Liquid Crystals."

It has been found that compounds having a mesomorphic state have elongated molecules, which are in some cases flattened as well, and which have one or more polar groups. By a polar group is meant a real separation of electrical charge centers. Because of the shape of the molecules, a parallel alignment to one another is favored. In the crystalline state, the molecules are arranged in this manner and are held together by attachments through the polar groups as well as by weaker Van der Waals forces. It is believed but is not essential to the successful practice of the present invention, that in going from the solid to the liquid state, the weaker Van der Waals bonds are broken first leaving the molecules with some degree of freedom of relative movement, but retaining to a great degree the tendency for the molecules to align themselves parallel to one another.

Liquid crystalline materials have been categorized to be of three types: the cholesteric, the nematic and the smectic. The smectic structure is characterized by the fact that the molecules are arranged in layers with their long axes approximately normal to the planes of the layers. In the nematic structure, there is no necessary layer-like arrangement, the only restriction on the arrangement of the molecules being that they preserve a nearly parallel orientation. Usually, liquid crystalline substances will show either the smectic or the nematic structure exclusively; some substances, however, can exhibit both structures, passing from one to the other upon a certain temperature change.

The arrangement of molecules in the cholesteric structure has not been definitely determined. The theory has been put forth that the cholesteric structure is a particular form of the nematic structure. The distinction of the cholesteric structure over the smectic and nematic structures is in its markedly different optical properties. Materials having the cholesteric structure are optically negative, while those having the nematic and smectic structures are optically positive. Of the three types of liquid crystalline materials only cholesteric liquid crystals have properties suitable for use in the device shown in FIG. 1.

A temperature stabilization means 39 is provided to maintain the thermally sensitive film 26 at a background temperature which is uniform over the film surface and; in addition, can vary only within a restricted temperature range. This is necessary because the optical properties of the thermally sensitive film utilized in the present invention depend upon the film material being in the liquid crystalline phase. A particular material is only in the liquid crystalline phase within a definite temperature range. Therefore, it is necessary to maintain the temperature of the film in this temperature range.

Further temperature control is often desirable and may also be effected by the temperature stabilization means 39, in order to maintain the film at its most sensitive temperature within the temperature range in which it is in the liquid crystalline phase. For the foregoing purposes, the temperature stabilization means 39 is shown as an incandescent heat lamp. It is obvious that other temperature stabilization means are suitable but it must be remembered that it is desirable that the film background temperature be as uniform as possible. Control of the temperature stabilization means may be made adjustable in order that the film may have an adjustable sensitivity. This would be useful, for example, to reduce sensitivity where too high a sensitivity would lead to the formation of a misleading image.

While shown in the drawing as a heat lamp, the temperature stabilization means 39 may or may not, depending on the material used for the thermally sensitive film 26, elevate the temperature of the film appreciably above ambient. Its function is to stabilize the film background temperature in the proper region so that it is thermally sensitive. Conceivably the temperature stabilization means 39 would in some cases be used to extract heat from the film 26 to maintain it at a background temperature which is below ambient. Automatic control of the heating means 39 by means of suitable feedback circuitry, which is well known in the art, is possible. Where ambient temperature is not expected to vary beyond the range in which the film 26 is in the liquid crystalline state, no temperature stabilization is required but may be used to enhance sensitivity.

Thin films of cholesteric liquid crystals exhibit a property, upon interaction with light, which may be termed selective scattering. The term scattering is used rather than reflection in order to distinguish from the effect occurring on mirror surfaces wherein light is reflected at an angle equal to the angle of incident light. A scattered light ray may leave the scattering material at an angle unrelated to the angle of incident light. A selectively scattering film, when observed with light impinging the film on the same side as that which is viewed, has an apparent color which is the complement of the color of the light transmitted by the film. That is, the light scattered from the film is within a wavelength band which, if added to the light transmitted through the material, would form white light, if white light was incident to the film.

The terms "light" and "color" as used herein have the broad connotation of referring to electromagnetic radiation generally, rather than to solely visible radiation.

Most materials do not selectively scatter light in that the light transmitted through them is not complementary to the light scattered by them but rather is within the same wavelength band. The difference in effect between selectively scattering materials and ordinary materials is believed due to the fact that in ordinary materials some light is absorbed by electron-photon interaction while in selectively scattering materials there is very little absorption. This explanation is not essential to the successful practice of our invention but may aid in understanding the operation thereof.

The phenomenon of selective scattering as exhibited by cholesteric liquid crystalline films is independent of whether the light illuminating the film is polarized or not. The color and intensity of the scattered light depends upon the temperature of the scattering material and upon the angle of incidence of illumination.

If such a film is illuminated with circularly polarized light, in addition to the property of selective scattering, it will also exhibit the property of circular dichroism. This latter effect may be defined as the differential interaction of a material upon circularly polarized light of different senses. Unpolarized light comprises right and left handed circularly polarized components of equal intensity. Upon interaction with a film of circularly dichroic material the right handed component is transmitted with a different intensity than the left handed component. The extent of the difference is a function of temperature in cholesteric liquid crystalline materials. This difference is believed to be a result of preferential scattering or absorption within the material but it is not known that this explanation has been confirmed.

Another property exhibited by cholesteric liquid crystalline material is what is commonly known as optical activity. Optical activity is observed by illuminating the material with linearly polarized light. Due to the optical activity of the material, also called optical rotatory power, the polarization vector of the light is caused to rotate. The amount of this rotation has been found to be dependent upon the temperature of the material.

Cholesteric liquid crystalline materials which are suitable for use as the thermally sensitive film 26 include derivatives of $\Delta^5$-cholestene-$3^\beta$ as well as compounds derived from cholesterol. All these compounds are characterized by having a cholesteric liquid crystalline phase.

Examples of suitable materials include mixed esters of cholesterol and inorganic acids such as cholesterol chloride, cholesterol nitrate, etc., organic esters of cholesterol such as cholesterol crotonate, cholesterol nonanoate, cholesterol chloroformate, cholesterol linolate, cholesterol linolenate, cholesterol oleate, cholesterol erucate, cholesterol butyrate, cholesterol caprate, cholesterol laurate, cholesterol myristate, and cholesterol clupanodonate, etc.; ethers of cholesterol such as cholesterol decyl ether, cholesterol lauryl ether, cholesterol oleyl ether, etc.; carbamates and carbonates of cholesterol such as cholesterol decyl carbonate, cholesterol oleyl carbonate, cholesterol heptyl carbamate, etc., alkyl amides and aliphatic secondary amines derived from $3^\beta$-amino-$\Delta^5$-cholestene. The corresponding derivatives of beta-sitosterol as well as active amyl ester of cyano benzilidene amino cinnamate may be effective.

The alkyl portion of the above compounds comprises at least one compound selected from the group consisting of saturated and unsaturated fatty acids and alcohols having from 1 to 27 carbon atoms per molecule, the unsaturated members having from 1 to 6 olefinic groups per chain.

It should be noted that not only have the aforementioned compounds been found useful, but mixtures of two or more such compounds have also been used. The advantage of mixing the pure compounds is to obtain certain properties desired for a particular application; for example, to obtain high sensitivity within a particular temperature range which may be made as broad or narrow as one desires for most practical purposes.

As a particular example of a film used in the practice of this invention a mixture was made of cholesterol crotonate and cholesterol oleate. The cholesterol oleate was prepared by a reaction of oleic acid with cholesterol in the presence of an acid catalyst. A suitable catalyst is p-toluenesulfonic acid. The cholesterol crotonate was prepared by the direct reaction of crotanyl chloride with cholesterol. A mixture of equal quantities of these compounds was then dissolved in chloroform in a concentration sufficient to form a readily flowing solution. The thermally sensitive film was formed by pouring the solution onto the support film, which in this case was polyethylene terephthalate to which the infrared absorbing layer had already been applied, and allowing the solvent to evaporate. The resulting film has a high viscosity. The particular example just described is sensitive near room temperature.

An example of another film is one of the following composition:

|  | Percent |
| --- | --- |
| Cholesterol nonate | 45 |
| Cholesterol linolineate | 50 |
| Cholesterol chloride | 5 |

This composition is sensitive over a temperature range of from about 1° to 100° C.

An alternative target structure may be formed by sandwiching the thermally sensitive film between a thin film of silicon monoxide and a thin film of aluminum oxide. On the free surface of the aluminum oxide a layer of infrared absorbing material is deposited. To make such a target, potassium bromide was first evaporated upon a clean glass slide followed by depositing a layer of silicon monoxide in the same manner. The material from which the thermally sensitive film was to be made was then melted on the slide and a thin film of aluminum oxide was placed over it. The target was removed from the glass slide by dissolving the potassium bromide with water which allowed the target to float free. This method has been found somewhat less desirable than that previously described because of the relatively greater number and size of non-uniformities occurring in the fabricated target. Such a target, however, has been found to have a low thermal time constant and low lateral heat conductivity.

Because of the exceptional optical properties of cholesteric liquid crystalline films there are several modes of operating a device in accordance with the present invention. As before stated a film of the thermally sensitive material exhibits selective scattering of light incident to it. This light may be linearly polarized, circularly polarized or unpolarized and in addition may be either monochromatic or white light.

Referring now to FIG. 3 there is shown a characteristic curve 60 resulting from the illumination of the thermally sensitive film 26 of FIG. 2 with visible white light. As shown there, the color of the scattered light is determined by the temperature of the film at the point of scattering. Visible colors will appear corresponding to the temperature of each point on the film. For example, an elemental area having a temperature of about 21° C. would appear red to a viewer while an area having a temperature of about 23° C. would appear green, as is shown at points 61 and 62, respectively, of the curve 60. The values shown in FIG. 3 are merely typical, other films would be thermally sensitive in other temperature ranges. If a thermal image were imposed upon the thermally sensitive film, illumination with white light would result in a color pattern because of the temperature dependent selective scattering as shown in FIG. 3. For this purpose the lamp 36 would be a broad band light source whose output is substantially unfiltered before striking the film 26.

Figure 4:
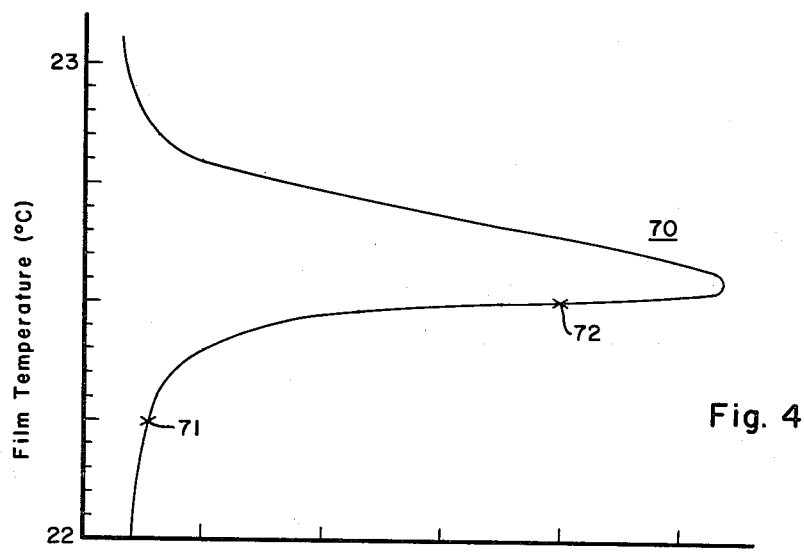

Referring now to FIG. 4 there is shown a curve 70 of temperature versus intensity of scattered light for the case in which the thermally sensitive film 26 of FIG. 2 is illuminated with monochromatic light. The resulting visible image is an intensity pattern. The light from an elemental area having a temperature of 22.25° C. is of markedly different intensity from that from an elemental area having a temperature of 22.5° C., as is shown at points 71 and 72, respectively, of the curve 70. For this purpose the film should be illuminated by a light of a wavelength to which it is thermally sensitive. In this case the lamp 36 may be a mercury discharge light source used with a filter 37 allowing the passage of only the 5540 angstrom radiation.

The curves 60 and 70 of FIGS. 3 and 4, respectively, closely approximate the results obtained when using a thermally sensitive film having a composition of about 30% cholesterol butrate and about 70% cholesterol myristate made in accordance with the foregoing teachings.

FIG. 5 is an alternate embodiment of the present invention wherein parts corresponding to those shown in FIG. 1 are given like reference numerals. A modification has been made in order to provide an additional face 14' on the enclosure 10. An offset portion 50 has been provided on the enclosure 10 so that impinging infrared radiation passing through the face 12 will strike the target 20 on the same side on which the target is illuminated by the lamp 36. The windows 14 and 14' are transmissive to the radiation from the lamp 36. Between the lamp 36 and the input face 14', there is provided a polarizer 52. There may also be provided a pass band filter 37. Between the output window 14 and the viewer 38, there is provided an analyzer 53.

In accordance with the teaching of copending application Serial No. 821,567, by J. H. Lady, filed June 19, 1959, and assigned to the same assignee as the present invention, a thermal image on a thermally sensitive film may be made visible by the transmission of linearly or circularly polarized light therethrough. For this purpose either white or monochromatic light may be used and is provided by the lamp 36. If monochromatic light is to be employed, the filter 37 is provided. The light is passed through the polarizer 52 before striking the target 20 and transmitted light is passed through the analyzer 53 for viewing.

In FIG. 5 the target 20 comprises the same layers 24, 25 and 26 as are provided in the target of FIG. 1 and as are shown in FIG. 2. Particularly, a thermally sensitive film 26 of a material having a cholesteric liquid crystalline phase is provided in the target. Analogous to the operation of the embodiment in FIG. 1, when the film 26 is illuminated with monochromatic light, an intensity image is obtained, and, when illuminated with white light, a color image is obtained. Heat stabilization means 39 is provided to maintain the film 26 at a uniform background temperature within the region in which it is liquid crystalline. The operation of the device of FIG. 5 is made possible by the optical activity of the thermally sensitive film 26 when it is illuminated by linearly polarized light. The viewed image is obtained by light transmitted rather than scattered by the film. Therefore, it is necessary that the infrared absorbing layer 25 be transparent to the visible radiation to be transmitted through the film. For this purpose a layer of evaporated nickel is suitable.

The device of FIG. 5 may be operated also by illuminating the target with circularly polarized light. In this case, the light may be either monochromatic or white to provide an intensity image or a color image, respectively. Where circularly polarized light is used, the images are achieved by reason of the circular dichroism of the thermally sensitive film 26. It is not necessary to use the analyzer 53 where circularly polarized light is used.

It is to be understood that in the various devices which are possible in accordance with the present invention, a temperature pattern produced by the impinging infrared radiation is imposed on the thermally sensitive member 26. There is substantially no reaction of the incoming infrared radiation per se with the themally sensitive member 26 because it has previously been absorbed and converted to heat. A further important point is that the resulting image formed by devices in accordance with this invention is scattered from or transmitted by the thermally sensitive member 26 without frequency change. That is, the output image is of radiation within the same waveband as the radiation emitted by the illumination source 36. This is believed due to the fact that essentially no energy transfer occurs upon interaction of the light from the illumination source 36 with the thermally sensitive film 26.

While the present invention has been described in only a few embodiments, it will be apparent to those skilled in the art that the practice of the present invention may assume many other forms without departing from the spirit and scope thereof.

We claim as our invention:

1. An article for optically presenting a temperature pattern established on a first member; said article comprising a thermally sensitive member disposed in thermally conductive contact to said first member, said thermally sensitive member comprising a material having a cholesteric liquid crystalline phase exposed to optical radiation.

2. An article for converting a temperature pattern established on a first member to an optical pattern; said article comprising a thermally sensitive film disposed in thermally conductive contact to said first member to impose said temperature pattern on said thermally sensitive film, said thermally sensitive film comprising a material in the cholesteric liquid crystalline phase and exposed to optical radiation of a wavelength selectively scattered in a temperature dependent manner by said thermally sensitive film.

3. In a thermal imaging device: an enclosure containing an image forming target structure comprising a support film having a thickness of no more than about 0.00025 inch, said support film being supported solely at the periphery thereof, a layer of infrared absorbing material disposed on one surface of said support film and a layer of thermally sensitive material having a cholesteric liquid crystalline phase disposed on the opposite surface of said support film so that infrared radiation absorbed by said infrared absorbing layer establishes a temperature pattern on said layer of thermally sensitive material in accordance with the intensity of impinging infrared radiation and said layer of thermally sensitive material responds in a reversible thermally dependent manner to selectively scatter visible radiation incident thereon.

4. In a thermal imaging device: an evacuated enclosure having a first face transmissive to infrared radiation and a second face transmissive to visible radiation; an image forming target structure contained within said enclosure and comprising a support film of polyester plastic material having a thickness of no more than about 0.00025 inch, said support film being solely peripherally supported, a layer of infrared absorbing material disposed on one surface of said support film facing said first face of said enclosure and a layer of a thermally sensitive film of cholesteric liquid crystalline material on the opposite surface of said support film facing said second face of said enclosure so that infrared radiation passing through said first face is absorbed by said infrared absorbing layer and establishes a temperature pattern on said thermally sensitive film in accordance with the intensity of impinging infrared radiation and visible light passing through said second face reacts with said thermally sensitive film of material in a reversible temperature dependent manner to provide a visible image of said infrared pattern.

5. In a thermal imaging device: an image forming target structure comprising an infrared absorbing layer and a film of a material having a liquid crystalline phase exhibiting the optical properties of selective scattering and circular dichroism; and means to maintain said film within a temperature range in which it is in the liquid crystalline phase.

6. In a thermal imaging device: an image forming target structure comprising an infrared absorbing layer and a film of material having a cholesteric liquid crystalline phase disposed adjacent said infrared absorbing layer so that infrared radiation absorbed by said infrared absorbing layer establishes a temperature pattern on said film of material in accordance with the intensity of impinging infrared radiation; means to maintain the temperature of said film of material within a temperature range in which said material is in the cholesteric liquid crystalline phase; and illuminating means directing visible radiation onto said target structure to make visible said temperature pattern on said film.

7. In a thermal imaging device: an image forming target structure comprising an infrared absorbing layer and a thermally sensitive film of cholesteric liquid crystalline material disposed adjacent said infrared absorbing layer so that infrared radiation absorbed by said infrared absorbing layer establishes a temperature pattern on said thermally sensitive film in accordance with the intensity of impinging infrared radiation; and illuminating means directing substantially white visible light onto said thermally sensitive film to form by interaction therewith a color image corresponding to the temperature pattern on said thermally sensitive film.

8. In a thermal imaging device: an image forming target structure comprising an infrared absorbing layer and a thermally sensitive film of cholesteric liquid crystalline material disposed adjacent said infrared absorbing layer so that infrared radiation absorbed by said infrared absorbing layer establishes a temperature pattern on said thermally sensitive film in accordance with the intensity of impinging infrared radiation; and illuminating means directing visible monochromatic radiation onto said thermally sensitive film to form by interaction therewith an intensity pattern corresponding to said temperature pattern on said thermally sensitive film.

9. A thermal imaging device comprising: an enclosure having a first face of a material transparent to infrared radiation and a second face of a material transparent to visible radiation; a target structure disposed within said enclosure, said target structure comprising a layer of an infrared absorbing material and a film of thermally sensitive material having a chloesteric liquid crystalline phase; optical means for focusing infrared radiation onto said infrared absorbing layer; and illuminating means for directing visible radiation through said second face of said enclosure onto said film of thermally sensitive material.

10. A thermal imaging device comprising: an evacuated enclosure having a first face of a material transparent to infrared radiation and a second face of a material transparent to visible radiation, said second face disposed substantially parallel to said first face; a target structure disposed within said evacuated enclosure substantially parallel to said first and second faces, said target structure comprising a thin support film, an infrared absorbing layer disposed on said thin support layer on the side thereof facing said first face of said evacuated enclosure and a thermally sensitive film of cholesteric liquid crystalline material disposed on said thin support film on the side thereof facing said second face of said evacuated enclosure; optical means for directing infrared radiation through said first face of said evacuated enclosure and for focusing said radiation onto said infrared absorbing layer; heat stabilization means for maintaining said thermally sensitive film at a uniform background temperature within the range in which said film is in the cholesteric liquid crystalline phase; such that said infrared absorbing layer causes to be imposed on said thermally sensitive film a temperature pattern whereby each elemental area of said thermally sensitive film has a temperature differing from said uniform background temperature by an amount directly related to the intensity of infrared radiation incident to the corresponding elemental area of said infrared absorbing layer; illuminating means for directing visible radiation onto said thermally sensitive film, said visible radiation interacting with said thermally sensitive film such that the visible radiation is selectively scattered from each elemental area of said thermally sensitive film in accordance with the temperature of said elemental area thereby forming a visible image corresponding to said temperature pattern.

11. A thermal imaging device comprising: an enclosure having a first face of a material transparent to infrared radiation and second and third faces of a material transparent to visible radiation; a target structure disposed within said enclosure, said target structure comprising juxtaposed contiguous layers of an infrared absorbing material which is transparent to visible radiation and a thermally sensitive film of cholesteric liquid crystalline material, said infrared absorbing layer so disposed that radiation passing through said first and second faces of said enclosure impinges thereon, said thermally sensitive film so disposed so as to face said third face of said enclosure; optical means for directing infrared radiation through said first face of said enclosure and focusing said radiation onto said infrared absorbing layer, illuminating means for directing visible radiation through said second face of said enclosure and through said infrared absorbing layer onto said thermally sensitive film; and means to view said thermally sensitive film through said third face.

12. A thermal imaging device comprising: an evacuated enclosure having a first face of a material transparent to infrared radiation and second and third faces of a material transparent to visible radiation; a target structure disposed within said evacuated enclosure substantially parallel to said third face, said target structure comprising a thin support film, an infrared absorbing layer which is transparent to visible radiation disposed on said thin support film on the side thereof opposite said third face, a thermally sensitive film of cholesteric liquid crystalline material disposed on said thin support film on the side thereof facing said third face; optical means for directing infrared radiation through said first face of said evacuated enclosure and for focusing said radiation onto said infrared absorbing layer; heat stabilization means for maintaining said thermally sensitive film at a uniform background temperature, such that said infrared absorbing layer causes to be imposed on said thermally sensitive film a temperature pattern, each elemental area of said thermally sensitive film having a temperature differing from said uniform background temperature by an amount directly related to the intensity of infrared radiation incident to the corresponding elemental area of said infrared absorbing layer; illuminating means for directing visible radiation through said second face and through said infrared absorbing layer onto said thermally sensitive film, said visible radiation interacting with said thermally sensitive film to form a visible image corresponding to said temperature pattern.

References Cited in the file of this patent

UNITED STATES PATENTS

| | | |
|---|---|---|
| 2,524,862 | White | Oct. 10, 1950 |
| 2,623,183 | Buck | Dec. 23, 1952 |
| 2,788,452 | Sternglass | Apr. 9, 1957 |
| 2,879,424 | Garbuny et al. | Mar. 24, 1959 |
| 2,945,305 | Strickler | July 19, 1960 |
| 2,959,678 | Jones | Nov. 8, 1960 |
| 2,962,592 | Hoecker et al. | Nov. 29, 1960 |
| 3,020,406 | Whitney | Feb. 6, 1962 |
| 3,025,763 | Schwartz | Mar. 20, 1962 |

OTHER REFERENCES

The Mesomorphic State—Liquid Crystals, by Brown et al., Chemical Reviews, vol. 57, No. 6, December 1957, page 1049.

RCA Technical Note No. 299, June 1959, by Frederick H. Nicoll, entitled Radiation Sensitive Device for Viewing Low Intensity Heat Images.